United States Patent
Graumann et al.

(10) Patent No.: US 8,227,956 B2
(45) Date of Patent: Jul. 24, 2012

(54) MOBILE USER INTERFACE WITH ENERGY HARVESTING

(75) Inventors: David L. Graumann, Portland, OR (US); Harry G. Skinner, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 879 days.

(21) Appl. No.: 12/323,371

(22) Filed: Nov. 25, 2008

(65) Prior Publication Data

US 2010/0127967 A1    May 27, 2010

(51) Int. Cl.
*H01L 41/08* (2006.01)
(52) U.S. Cl. ....................................................... 310/339
(58) Field of Classification Search .................. 310/329, 310/339
See application file for complete search history.

(56) References Cited

U.S. PATENT DOCUMENTS

| | | | | |
|---|---|---|---|---|
| 3,056,932 A | * | 10/1962 | Wood | 331/185 |
| 3,800,171 A | * | 3/1974 | Ishii et al. | 310/339 |
| 3,972,038 A | * | 7/1976 | Fletcher et al. | 340/870.24 |
| 4,354,189 A | * | 10/1982 | Lemelson | 340/5.61 |
| 4,535,324 A | * | 8/1985 | Levental | 340/574 |
| 4,595,864 A | * | 6/1986 | Stiefelmeyer et al. | 315/246 |
| 4,612,472 A | * | 9/1986 | Kakizaki et al. | 310/339 |
| 5,801,475 A | * | 9/1998 | Kimura | 310/319 |
| 6,861,785 B2 | * | 3/2005 | Andre et al. | 310/339 |
| 6,876,135 B2 | * | 4/2005 | Pelrine et al. | 310/339 |

OTHER PUBLICATIONS

Paradiso, J.A., "Systems for human-powered mobile computing", Design Automation Conference, 2006 43rd ACM/IEEE, Jul. 24-28, 2006, pp. 645-650.

* cited by examiner

*Primary Examiner* — Mark Budd
(74) *Attorney, Agent, or Firm* — Blakely, Sokoloff, Taylor & Zafman LLP

(57) ABSTRACT

A mobile user interface with energy harvesting is presented. In one embodiment, the mobile user interface comprises a striker, a piezoelectronic element to generate electric energy in response to being struck by the striker under control of an elastic mechanism, and a transmitter coupled to use the electric energy to transmit a signal wirelessly.

16 Claims, 7 Drawing Sheets

Figure 1
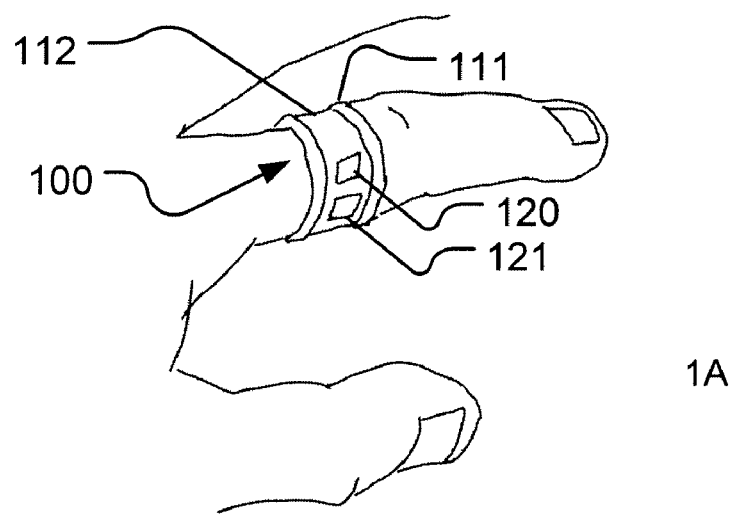
1A
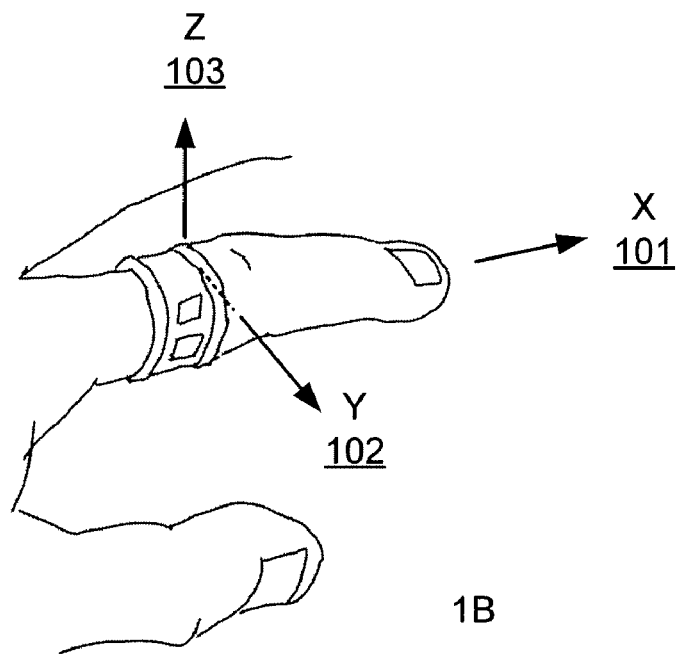
1B

FIG. 5
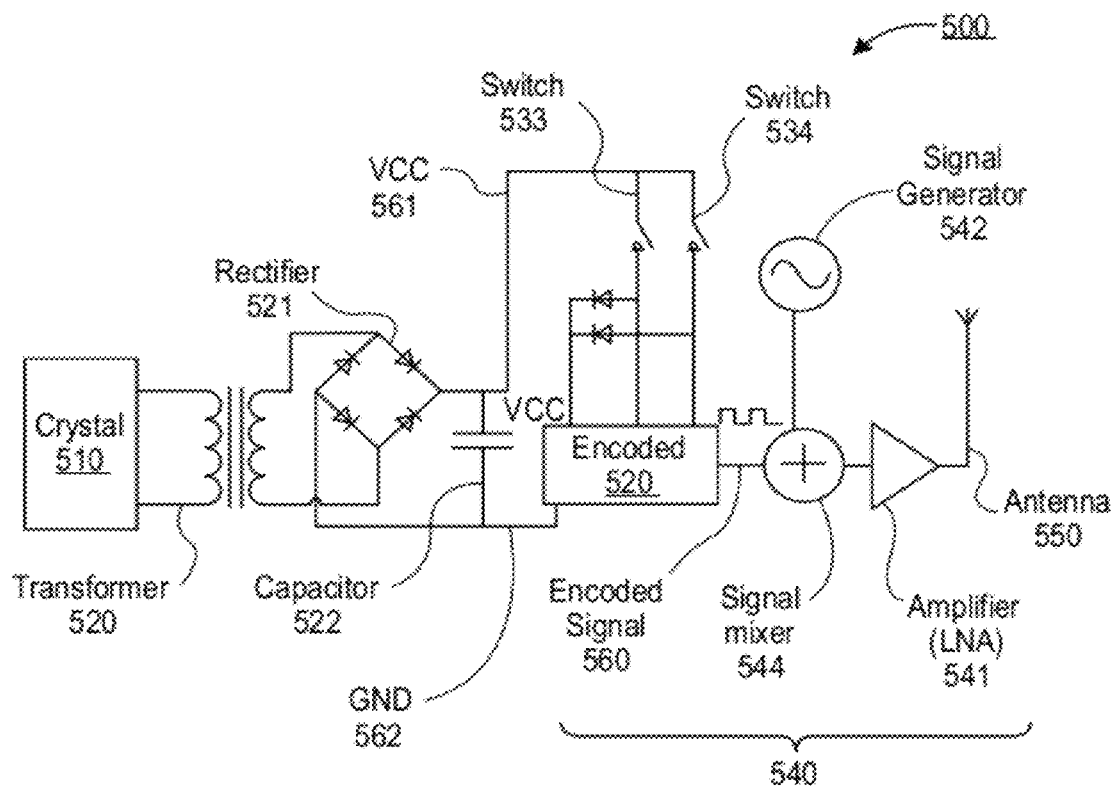

MOBILE USER INTERFACE WITH ENERGY HARVESTING

FIELD OF THE INVENTION

Embodiments of the invention relate to user interface devices; more particularly, embodiments of the invention relate to mobile user interface and energy harvesting.

BACKGROUND OF THE INVENTION

Recently, mobile computing devices are becoming smaller and offering more user features. A mobile internet device (MID), for example, is a multimedia-capable handheld computing device use in conjunction with wireless internet access.

Device manufacturers provide different user interfaces for application control on mobile devices. Such user interfaces usually require direct physical contact with the mobile devices. Examples of user interfaces include touch screens and on-device buttons. Typically, the user interfaces require use of two hands to operate which is not very convenient especially when a user is busy with another task or is handling one or more computing devices at the same time.

Moreover, user interfaces consume battery power to operate. If a user interface component is built-in with a portable device, the component consumes power from a battery of the portable device. This reduces the battery life of the portable device. On the other hand, for a user interface component that is standalone (detached from a portable device) and requires a battery to operate, the battery increases the weight and the size of the component itself. Additionally, users need to recharge or replace a battery so that the user interface component operates properly.

BRIEF DESCRIPTION OF THE DRAWINGS

Embodiments of the present invention will be understood more fully from the detailed description given below and from the accompanying drawings of various embodiments of the invention, which, however, should not be taken to limit the invention to the specific embodiments, but are for explanation and understanding only.

FIGS. 1a and 1b show an embodiment of a finger ring as a mobile user interface.

FIG. 5 is a block diagram of a mobile user interface system in accordance with an embodiment of the invention.

DETAILED DESCRIPTION OF THE INVENTION

Figure 2:
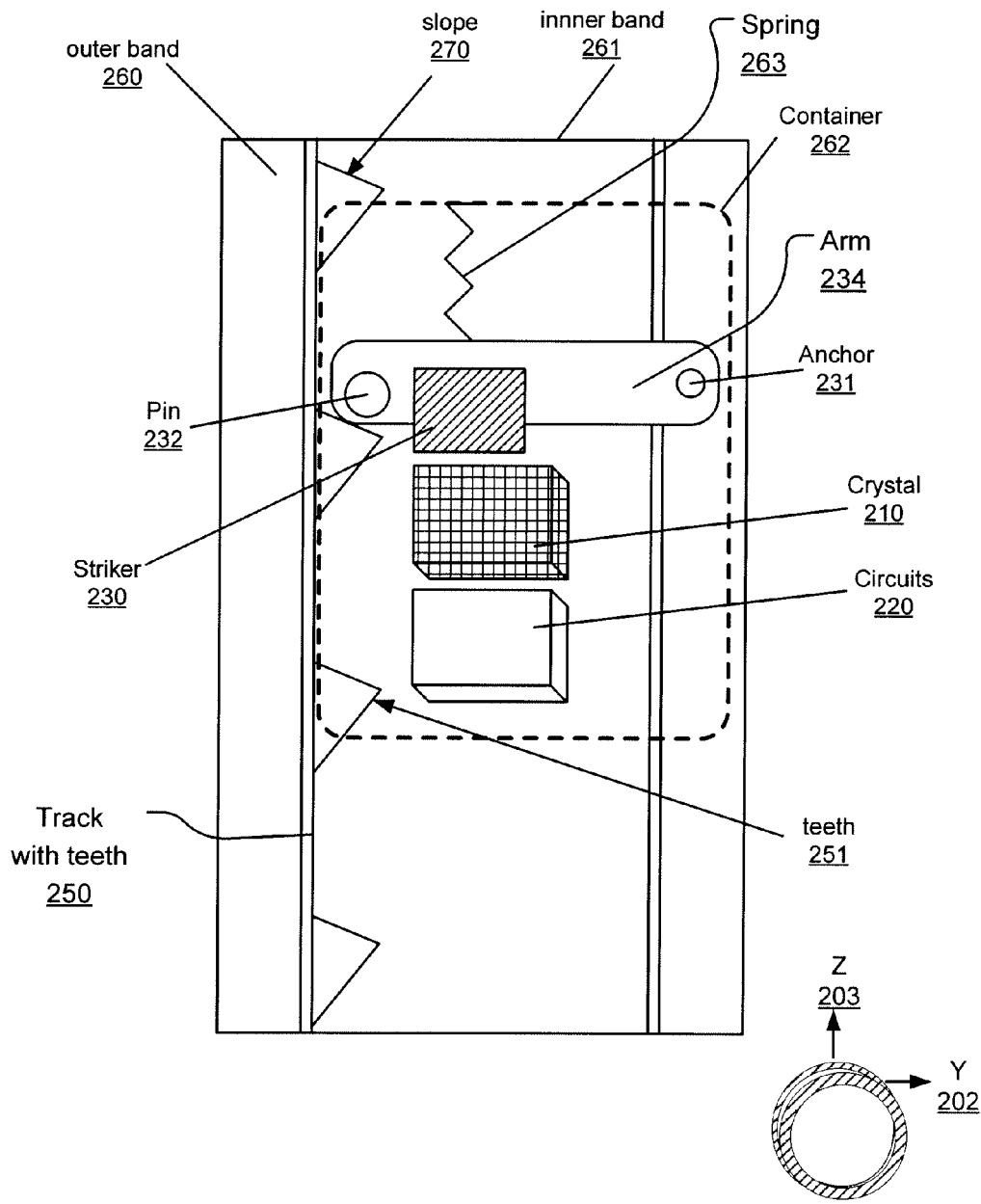
FIG. 2 shows an embodiment of a mobile user interface with an energy harvesting function when viewed in direction Z.

A mobile user interface with an energy harvesting function is presented. In one embodiment, the mobile user interface comprises a striker, a piezoelectronic element to generate electric energy in response to being struck by the striker under control of an elastic mechanism, and a transmitter coupled to use the electric energy to transmit a signal wirelessly.

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Some portions of the detailed descriptions which follow are presented in terms of algorithms and symbolic representations of operations on data bits within a computer memory. These algorithmic descriptions and representations are the means used by those skilled in the signal processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Overview

FIGS. 1a and 1b show an embodiment of a finger ring as a mobile user interface. Referring to FIG. 1, in one embodiment, mobile user interface 100 comprises outer band 111, inner band 112, and buttons 120-121. In one embodiment, mobile user interface 100 comprises a mechanism to convert human movement to electric energy. In one embodiment, mobile user interface 100 stores the electrical energy and uses the energy to power a wireless transmission circuit to transmit user inputs when buttons 120-122 are pressed. Mechanisms to generate electrical power and to transmit user inputs will be described in further detail below with additional references to the remaining figures.

In one embodiment, outer band 111 is rotatable while inner band 112 is stationary. In one embodiment, outer band 111 is stationary while inner band 112 is rotatable. In one embodiment, buttons 120-121 are part of inner band 112. In one embodiment, buttons 120-121 are part of outer band 111. In one embodiment, mobile user interface 100 comprises one or more bands and one or more buttons to support the requirements of different application control.

In one embodiment, a user wears mobile user interface 100 on any of the fingers (e.g., index finger) and presses buttons 120-121 with any other fingers (e.g., thumb). In one embodiment, buttons 120-121 provide a variety of uses, similar to buttons on a mouse pointing device. In one embodiment, mobile user interface 100 comprises other sensors, such as, for example, pressure sensors, motion sensors, level sensors, etc., to capture inputs for different applications.

In one embodiment, information is transmitted from mobile user interface 100 to another portable computing device, such that users need not reach for the portable computing device when they intend to control an application or to provide inputs to an application running on the portable computing device.

In one embodiment, mobile user interface 100 is maintenance-free because no battery is installed as a power supply. Users need not worry about running out of battery power or attending to the nuisance of replacing or recharging a battery.

Referring to FIG. 1b, an embodiment of mobile user interface 100 is presented with indications to show three directions of views. Direction X 101 is a front view of mobile user interface 100. Direction Y 102 is a side view of mobile user interface 100. Direction Z 103 is a top view of mobile user interface 100.

FIG. 2 shows an embodiment of a mobile user interface with an energy harvesting function when viewed in direction Z. Many related components have not been shown to avoid obscuring the embodiment of the present invention. Referring to FIG. 2, arrow 203 indicates a direction in which a finger ring is being viewed. In one embodiment, a mobile user interface comprises track 250, spring 263, arm 234, striker 230, anchor 231, pin 232, crystal 210, circuits 220. Track 250 comprises multiple teeth structures 251. In one embodiment, a mobile user interface is a finger ring including outer band 260 and inner band 261.

In one embodiment, container 262 is a housing for spring 263, arm 234, striker 230, anchor 231, pin 232, crystal 210, and circuits 220 and is stationary disposed to outer band 260. In one embodiment, one end of spring 263 is coupled to a wall of container 262 and another end of spring 263 is coupled to arm 234 which is pivotably mounted on outer band 260 by anchor 231. Striker 230 and pin 232 are located on arm 234. In one embodiment, crystal 210 is located at a position where striker 230 hits when propelled by spring 263. Circuits 220 are coupled to crystal 210. Circuits 220 will be described in further detail below with additional references to the remaining figures.

In one embodiment, track 250 is coupled to inner band 261 such that track 250 moves relatively when inner band 261 is turned. In one embodiment, track 250 is coupled to outer band 260 such that track 250 moves relatively when outer bank 260 is turned. In one embodiment, a mobile user interface comprises an outer shell (not shown) over inner band 261. In one embodiment, inner band 261 is stationary and is covered by a shell, such that when the shell is turned, track 250 also moves relatively.

Operation

In one embodiment, the mechanical assembly shown in FIG. 2 is operable to repeatedly strike a structure (striker 230) against crystal 210 while inner band 261 is turned. In one embodiment, an elastic mechanism, which controls the movement of striker 230, comprises track 250, spring 263, arm 234, anchor 231, and pin 232.

In one embodiment, track 250 comprises many teeth structures 251 which form zigzag shapes of track 250. In one embodiment, teeth structures 251 form peaks and slopes. In one embodiment, the inclination of a slope is approximately 45°.

When track 250 moves, teeth structures 251 push pin 232 and cause arm 234 to compress spring 263. At the same time, pin 232 is moving along the slope (e.g., slope 270). When the position of pin 232 is over the height (peak) of teeth structures 251, pin 232 is released from that position and slides down the slope quickly. Spring 263 which was compressed (storing potential energy) propels arm 234 and striker 230 thereon to hit crystal 210. After pin 232 moves down along the slope, pin 232 is again pushed by teeth structures 251 causing arm 234 to compress spring 263. The process repeats as users turn inner band 261.

In one embodiment, spring 263 converts mechanical energy to potential energy (when spring 263 is compressed) and converts potential energy to mechanical energy (when spring 263 is released).

In one embodiment, crystal 210 is a piezoelectric crystal (e.g., quartz, lead zirconite titanate (PZT), etc.) that generates an electric potential difference in response to mechanical stress applied (hit by striker 230).

It will be appreciated by those of ordinary skill in the art that many combinations and arrangements may be used in accordance with the embodiment. Components may be added, removed, or placed differently to support the intended functions.

In one embodiment, turning outer band 260 or turning inner band 261 causes the same movement of striker 230. In one embodiment, outer band 260 is rotatable and track 250 moves in association with outer band 260, whereas container 262 is mounted to inner band 261.

In one embodiment, container 262 is substantially flat in quarters of millimeters. In one embodiment, arm 234, pin 232, and striker 230 are of one structure. In one embodiment, arm 234 is made from elastic material and spring 263 is not required.

In one embodiment, track 250 is a belt, a chain, or a ratchet with engaging structures to cause arm 234 to move and to compress spring 263. In one embodiment, pin 232 is a protruding structure located on arm 234 and extends in between teeth structures 251 of track 250.

In one embodiment, the mobile user interface is part of a finger ring. In one embodiment, circuits 220 are distributed at the top side of a finger ring. In one embodiment, a finger ring comprises more than two bands. In one embodiment, a finger ring comprises one or more sections, such as, for example, a top section, a bottom section, a left section, or a right section as a housing to accommodate the mobile user interface. In one embodiment, part of the mobile user interface is on a finger ring, in a finger ring, or the combination thereof.

Figure 3:
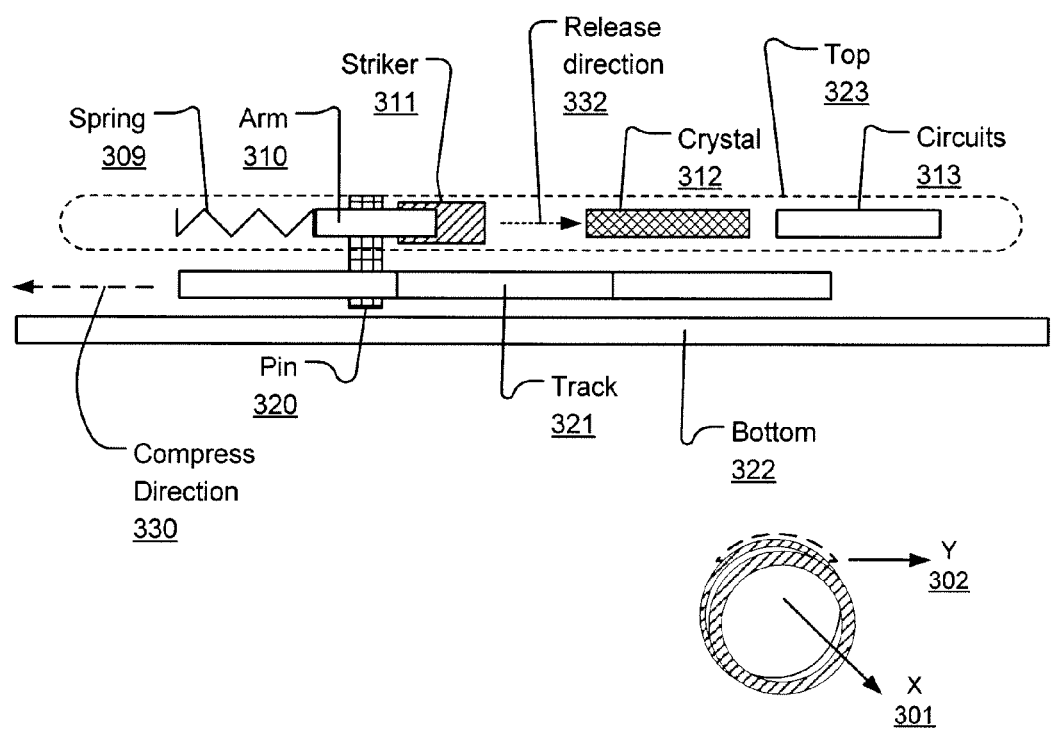
FIG. 3 shows an embodiment of a mobile user interface with an energy harvesting function when viewed in direction X.

FIG. 3 shows an embodiment of a mobile user interface with an energy harvesting function when viewed in direction X. Referring to FIG. 3, arrow 301 indicates in a direction in which a finger ring is being viewed. The figure is shown with a straight representation of a curvature along direction Y 302 for visual simplicity.

In one embodiment, a mobile user interface comprises top section 323, track 321, and bottom section 322. Top section 323 comprises spring 309, arm 310, striker 311, crystal 312, pin 320, and circuits 313.

In one embodiment, one end of spring 309 is coupled to a wall of top section 323 and another end of spring 309 is coupled to arm 310. Striker 311 and pin 320 are coupled to arm 310. In one embodiment, crystal 312 is positioned so that it will be hit by striker 311 when striker 311 is propelled by spring 309. Circuits 313 are coupled to crystal 312.

In one embodiment, track 321 is coupled to a structure that is movable by users, such that track 321 moves relatively together with the structure. In one embodiment, the structure is one of the bands on a finger ring. In one embodiment, when track 321 moves to direction 330, pin 320, that extends in between track 321, is caused to move in the same direction. As a result, spring 309 is compressed. In one embodiment, track 321 includes similar teeth structures 251 (FIG. 2) such that pin 320 is released when pin 320 reaches a certain position. Spring 309, released from compression, propels striker 311 towards direction 332, and striker 311 hits crystal 312.

In one embodiment, track 321 is formed in a circular shape as part of a ring or an entire ring. In one embodiment, striker 311 and crystal 312 are thin and arch-shaped as part of a ring.

Figure 4:
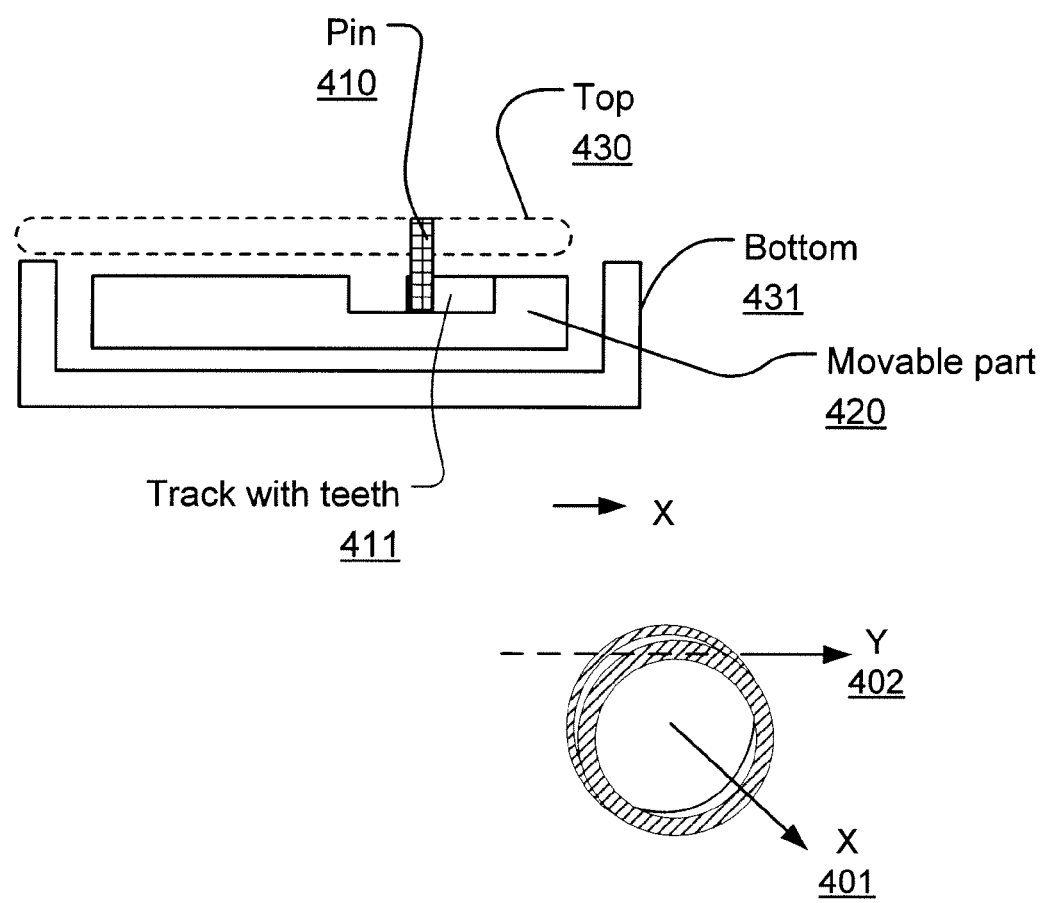
FIG. 4 shows an embodiment of a mobile user interface with an energy harvesting function when viewed in direction Y.

FIG. 4 shows an embodiment of a mobile user interface with an energy harvesting function when viewed in direction Y. Referring to FIG. 4, arrow 402 indicates in a direction in which a finger ring is being viewed.

In one embodiment, a mobile user interface comprises top section 430, moveable part 420, track 411, and bottom section 431. Top section 430 comprises pin 410 and other members to support the function of generating electrical power for the use of signal transmission. Pin 410 extends from top section 430 to the location in between teeth structures of track 411, such that the teeth structures affect the movement of pin 410. Track 411 is coupled to moveable part 420. Moveable part 420 is coupled to a structure such that moveable part 420 moves when users press, turn, or move the structure. In one embodiment, the structure is a band of a finger ring.

FIG. 5 is a block diagram of a mobile user interface system in accordance with an embodiment of the invention. Many related components have not been shown to avoid obscuring the embodiment of the present invention. In one embodiment, referring to FIG. 5, the system comprises user input transmitter 500 and user input receiver 570.

In one embodiment, user input transmitter 500 is a mobile user interface. User input transmitter 500 comprises crystal 510, transformer 520, rectifier 521, capacitor 522, switches 533-534, encoder 520, signal mixer 544, low noise amplifier (LNA) 541, signal generator 542, and antenna 550.

In one embodiment, wireless transmitter 540 comprises signal mixer 544, LNA 541, signal generator 542, and antenna 550. In one embodiment, wireless transmitter 540 comprises radio frequency (RF) front-end components.

In one embodiment, crystal 510 is coupled to transformer 520 which is coupled to rectifier 521 and capacitor 522. Encoder 520 is coupled to capacitor 522 and switches 533-534. Signal mixer 544 is coupled to signal generator 542 and is coupled to receive encoded signal 560 from encoder 520. In one embodiment, LNA 541 is coupled to signal mixer 544 and antenna 550. In one embodiment, capacitor 522 is an optional element.

In one embodiment, user input receiver 570 comprises an antenna, receiver logic 572, and computing device 571. In one embodiment, an antenna is coupled to receiver logic 572 coupled to computing device 571. In one embodiment, an antenna and receiver 572 are part of computing device 571. In one embodiment, computing device 571 is a mobile internet device (MID), a hand-held computer, a desktop, or a multimedia center.

Transmitter Operation

In one embodiment, user input transmitter 500 converts energy generated from crystal 510 to electrical energy to be stored in capacitor 522. The energy is used to power encoder 520 and wireless transmitter 540.

In one embodiment, when crystal 510 is hit, crystal 510 produces a short spike of high-voltage low-current electricity that charges capacitor 522 through conversion circuits comprising transformer 520 and rectifier 521. The circuits are inductively tuned and resistively matched. In one embodiment, energy stored in capacitor 522 is sufficient to transmit several subsequent button presses.

In one embodiment, transformer 520 is positioned in a ring or a part thereof. In one embodiment, transformer 520 is adapted into a curve structure and is positioned in a finger ring. In one embodiment, part of transformer 520 is formed with coils positioned in a finger ring or a part thereof.

In one embodiment, when switches 533-534 are open, the energy generated is stored in capacitor 522.

In one embodiment, when capacitor 522 is charged, pressing switches 533-534 generates encoded signal 560. When a switch of switches 533-534 is pressed, encoder 520 is connected to voltage supply (Vcc) 561. The circuit is complete and is able to supply power to encoder 520 and wireless transmitter 540. In one embodiment, encoder 520 and wireless transmitter 540 are coupled to receive power generated from crystal 510 without going through capacitor 522.

Based on which switch is pressed, an input associated with the switch is encoded as encoded signal 560. In one embodiment, one or more switches or buttons are available to allow different users inputs. In one embodiment, a variety of control behaviors are generated with the combinations of the switches. In one embodiment, a circuit (e.g., a timer) switches off encoder 520, wireless transmitter 540, or both after signals are transmitted or after a time period lapses. In one embodiment, an analog timer circuit switches off encoder 520, wireless transmitter 540, or both after a signal is transmitted. In one embodiment, a timer circuit is configurable based on the length of time to transmit a signal.

In one embodiment, encoder 520 comprises a microcontroller or a timer circuit. In one embodiment, encoder 520 sends a sequence of pulses with high and low voltages (or positive or negative voltages) in specific patterns. In one embodiment, encoded signal 560 is a square wave. In one embodiment, encoder 520 sends patterns that are easy to distinguish (the patterns have low correlation to each other). In one embodiment, the patterns are different in terms of the duration of a signal, the frequency of a signal, and the combinations thereof. In one embodiment, a signal transmission lasts for 2 ms.

In one embodiment, signal mixer 544 receives a carrier signal (e.g., a sine wave) from signal generator 542 and encoded signal 560 from encoder 520. Signal mixer 544 generates a spread spectrum signal to LNA 541. The signal is then transmitted via antenna 550. In one embodiment, the frequency of an output from signal mixer 544 is around the frequency of the carrier signal generated from signal generator 542. In one embodiment, the frequency of the carrier signal is approximately in the range of 300-450 MHz, 600-800 MHz, or frequency ranges permitted for consumer usage. In one embodiment, the carrier signal is a low power signal such that no FCC approval is required for use in conjunction with the embodiments of the invention.

In one embodiment, encoder 520 and wireless transmitter 540 are coupled to receive power generated from crystal 510 without going through capacitor 522. In one embodiment, wireless transmitter 540 is a RF transmitter. In one embodiment, a signal is transmitted in conjunction with radio frequencies (RF).

In one embodiment, wireless transmitter 540 transmits a signal wirelessly via one or more medium, such as, for example, air, human body, body skin, water, body fluids, etc. In one embodiment, signal mixer 544 and LNA 541 are designed accordingly based on the transmission medium.

In one embodiment, a signal transmitted from antenna 550 is received by user input receiver 570. The signal is decoded by receiver logic 572 to retrieve information about user inputs. In one embodiment, the information is sent to computing device 571 to control an application running thereon. In one embodiment, computing device 571 retransmits the information to one or more other computing devices.

In one embodiment, encoder 520 and wireless transmitter 540 operate with a 2.7V voltage supply. In one embodiment, encoder 520 generates a signal that encodes 24 bits per second. In one embodiment, the duty cycle and the frequency of encoded signal 560 are 50% and 50-70 kHz respectively.

In one embodiment, the impedance of antenna 550 is approximately 50 ohm and the transmit level of wireless transmitter 540 is approximately −4 dBm or lower. In one embodiment, antenna 550 is a circular coil in a finger ring.

In one embodiment, user input transmitter 500 is a batteryless device. In one embodiment, user input transmitter 500 is self-powered by incorporating an energy harvesting function.

In one embodiment, user input transmitter 500 is a ring. By pressing switches 533-534, users send a signal to a wrist watch to begin or to end a gesture recognition application running on the wrist watch. The wrist watch sends information from the gesture recognition to a remote computer as inputs to an application running on the remote computer. In one embodiment, by pressing switches 533-534, users control a playlist of a music player (e.g., change to a next song, change to a previous song). In one embodiment, users control the volume of a music player by pressing switches 533-534.

In one embodiment, user input transmitter 500 is adaptable as part of a wearable accessory for controlling an MID placed in pocket or in a purse. For example, users can execute a command such as, for example, "answer the phone", "record a note", "track this gesture", "turn on speech recognition", etc., without reaching for the MID. In one embodiment, without the need to replace or to recharge a battery, user input transmitter 500 is convenient to use.

In one embodiment, user input transmitter 510 transmits an asynchronous event (e.g., button press). In comparison to RFID (Radio-frequency identification) technology, a reader reads information from an RFID tag by detecting a reflected replica of a signal originated from the reader. Such RFID readers are therefore unable to detect an asynchronous event.

Figure 6:
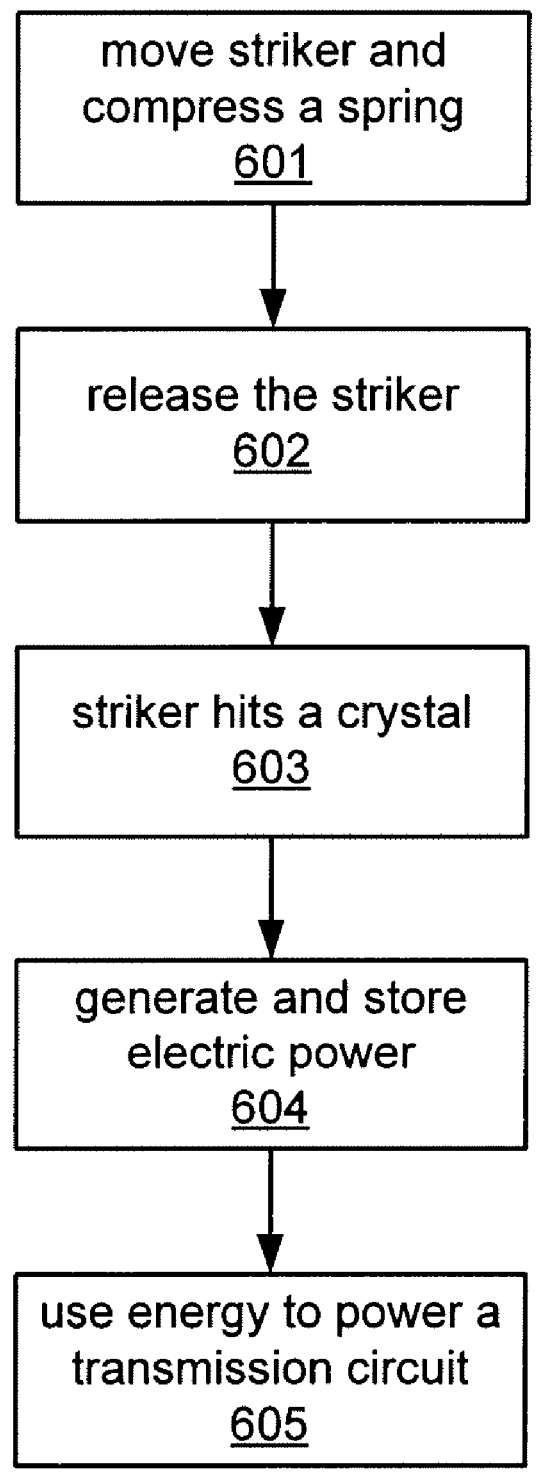
FIG. 6 is a flow diagram of a process of energy harvesting in accordance with an embodiment of the invention.

FIG. 6 is a flow diagram of a process of energy harvesting in accordance with an embodiment of the invention. Referring to FIG. 6, a method of energy harvesting is presented in accordance with one embodiment of the present invention.

In one embodiment, the method begins by setting a striker to a position while compressing a spring (process block 601). In one embodiment, rotating a band on a finger ring causes a striker (or a hammer-like structure) to retract while compressing a spring. In one embodiment, the spring is released from the compressed position and propels the striker to hit a piezoelectronic crystal (process blocks 602, 603).

In one embodiment, mechanical stress on a piezoelectronic crystal is transformed to electrical energy and is stored in an electrical storage element such as, for example, a capacitor of a electrical circuit (process block 604). In one embodiment, the energy stored in the capacitor is used to power an electronic circuit, for example, an encoder circuit, a wireless transmission circuit, or the combination thereof (process block 605). In one embodiment, the electronic circuits encode and transmit user inputs via wireless transmission.

Figure 7:
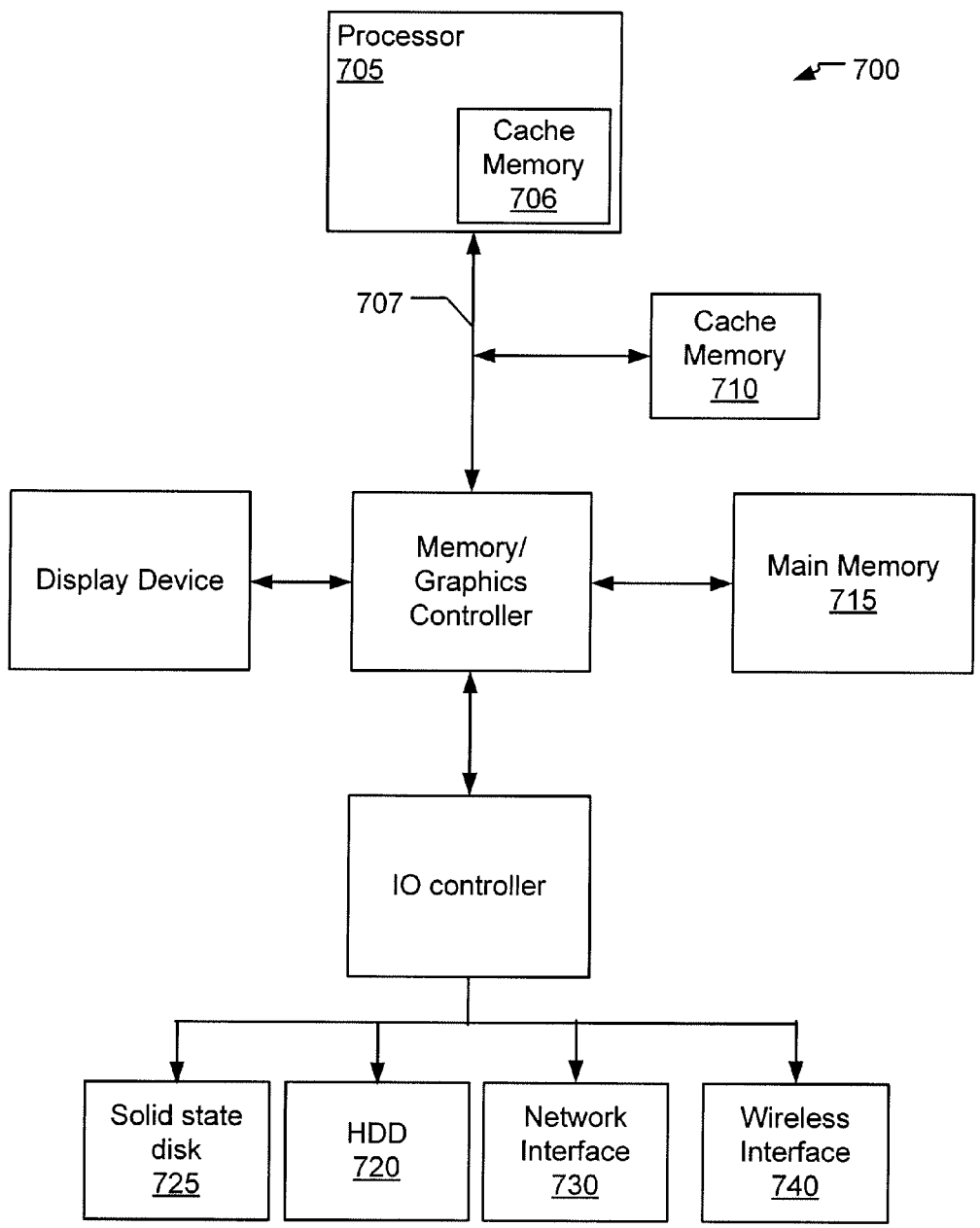
FIG. 7 illustrates a computer system for use in conjunction with one embodiment of the present invention.

FIG. 7 illustrates a computer system for use in conjunction with one embodiment of the present invention.

Embodiments of the invention may be implemented in a variety of electronic devices and logic circuits. Furthermore, devices or circuits that include embodiments of the invention may be included within a variety of computer systems. Embodiments of the invention may also be included in other computer system topologies and architectures.

FIG. 7, for example, illustrates a computer system in which one embodiment of the invention may be used. In one embodiment, the computer system comprises a mobile internet device (MID). A processor 705 accesses data from a level 1 (L1) cache memory 706, a level 2 (L2) cache memory 710, and main memory 715. In one embodiment, the cache memory 706 may be a multi-level cache memory comprise of an L1 cache together with other memory such as an L2 cache within a computer system memory hierarchy and cache memory 710 are the subsequent lower level cache memory such as an L3 cache or more multi-level cache. Furthermore, the computer system may have the cache memory 710 as a shared cache for more than one processor core. The processor 705 may have any number of processing cores.

The main memory 715 may be implemented in various memory sources, such as dynamic random-access memory (DRAM), a hard disk drive (HDD) 720, a solid state disk 725 based on NVRAM technology, or a memory source located remotely from the computer system via network interface 730 or via wireless interface 740 containing various storage devices and technologies. The cache memory may be located either within the processor or in close proximity to the processor, such as on the processor's local bus 707.

Other embodiments of the invention, however, may exist in other circuits, logic units, or devices within the system of FIG. 7. Furthermore, other embodiments of the invention may be distributed throughout several circuits, logic units, or devices in the form of hardware, software, or some combination thereof as illustrated in FIG. 7.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include but are not limited to processors, controllers, chipset components, programmable logic arrays (PLA), memory chips, network chips, or the like. Moreover, it should be appreciated that exemplary sizes/models/values/ranges may have been given, although embodiments of the present invention are not limited to the same. As manufacturing techniques (e.g., photolithography) mature over time, it is expected that devices of smaller size could be manufactured.

Whereas many alterations and modifications of the embodiment of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A apparatus comprising:
   a striker;
   a mechanism to cause the striker to retract and to propel;
   a piezoelectronic element to generate electric energy in response to being struck by the striker under control of the mechanism; and
   a transmitter coupled to use the electric energy to transmit a signal wirelessly; and
   a circular housing, wherein the striker, the piezoelectronic element, and an electric circuit are positioned in the circular housing, wherein the circular housing is a finger ring.

2. The apparatus of claim 1, wherein the mechanism comprises an elastic member.

3. The apparatus of claim 1, wherein the mechanism comprises a track, wherein the track comprises a plurality of engaging structures to move a protruding structure, coupled to the striker, to compress a spring.

4. The apparatus of claim 1, wherein the mechanism comprises a track, wherein the track is moveable and causes the striker to move to a first position while compressing a spring, wherein the striker propels towards the piezoelectronic element when the striker is released from the first position.

5. The apparatus of claim 1, wherein the mechanism comprises a track comprising a plurality of engaging structures to move a protruding structure coupled to a pivotably mounted arm, the striker being coupled to the mounted arm and is movable in association with the protruding structure.

6. The apparatus of claim 1, wherein the striker and the piezoelectronic element are positioned in a first part of the circular housing, wherein the mechanism comprises a track that is moveable in association with a second part of the circular housing.

7. The apparatus of claim 1, further comprising:
   a transformer coupled to the piezoelectronic element; and
   a rectifier coupled the transformer and an electric energy storage element.

8. The apparatus of claim 1, further comprising:
   an electric energy storage element to store the electric energy generated from the piezoelectronic element and to supply electrical power to the transmitter; and
   an electric circuit coupled to the electric energy storage element, wherein the transmitter is operable to transmit signals from the electric circuit wirelessly.

9. The apparatus of claim 1, further comprising a timer circuit to control transmission duration for the signal.

10. The apparatus of claim 1, further comprising one or more buttons, wherein the signal is based on an input from the one or more buttons.

11. A method comprising:
    setting a striker, by a mechanism, to a position that conserves potential energy, wherein the mechanism comprises a track, the track having a plurality of engaging structures to move a protruding structure, coupled to the striker, to compress a spring;
    generating energy by releasing the striker to strike upon a piezoelectronic element; and
    transmitting a signal wirelessly using the energy.

12. The method of claim 11, where the track includes a plurality of engaging structures to move the protruding structure, wherein the protruding structure and the striker are coupled to a pivotably mounted arm.

13. The method of claim 11, wherein the striker, an electric circuit, and the piezoelectronic element are positioned in a first part of a circular housing, wherein the track is moveable in association with a second part of the circular housing.

14. The method of claim 11, further comprising providing electrical power stored in an electrical energy storage element to a transmitter to transmit signals from an electric circuit.

15. The method of claim 11, wherein the striker, the piezoelectronic element, and an electric circuit are positioned in a circular housing, wherein the circular housing is a finger ring.

16. The method of claim 11, the signal is based on an input from one or more buttons coupled to an electric circuit.

* * * * *